United States Patent [19]
Dyson

[11] Patent Number: 4,738,051
[45] Date of Patent: Apr. 19, 1988

[54] GOBLET TRELLIS

[76] Inventor: John S. Dyson, R.R. 3, Box 430, Millbrook, N.Y. 12545

[21] Appl. No.: 322

[22] Filed: Jan. 5, 1987

[51] Int. Cl.$^4$ .............................................. A01G 17/06
[52] U.S. Cl. ...................................................... 47/46
[58] Field of Search .................... 47/46, 47, 4, 70, 44; 256/20, 11

[56] References Cited

U.S. PATENT DOCUMENTS

| | | | |
|---|---|---|---|
| 44,104 | 9/1864 | Mason | 47/46 |
| 166,766 | 8/1875 | Goodspeed | 47/47 |
| 3,157,001 | 11/1964 | Vail | 47/47 |
| 3,337,988 | 8/1967 | Burton | 47/46 |
| 3,690,033 | 9/1972 | Lewis | 47/46 |
| 4,336,667 | 6/1982 | Evans | 47/46 X |
| 4,625,454 | 12/1986 | Daniell | 47/47 X |

FOREIGN PATENT DOCUMENTS

| | | | |
|---|---|---|---|
| 54991 | 10/1974 | Australia | 47/46 |
| 2524964 | 10/1983 | France | 47/46 |

*Primary Examiner*—Robert E. Bagwill
*Assistant Examiner*—Danton D. DeMille
*Attorney, Agent, or Firm*—Michael Ebert

[57] ABSTRACT

A trellis for supporting horizontal wires to train grape vines whose canes grow upwardly. The trellis comprises a post which is set in the ground and a pair of tubular metal arms attached at their lower ends to opposite sides of the post, the arms having a bend therein to create above ground a symmetrical goblet-like form in which the portions of the arms above the bends diverge outwardly with respect to the post. The arms are bridged by a rigid cross brace which is attached at its ends to the arms at a point intermediate the bend and the upper end thereof, the brace being secured to the post to rigidify the structure. Bored at corresponding positions in the arms are three sets of holes, one set being adjacent the upper end, the other at about the intermediate point, and the third at about the bend. A series of spaced-apart trellises are set up in a vineyard row and wires are strung through their holes to create an array of horizontal wires at different levels for training the upwardly growing canes of grape vines planted in the spaces between the trellises in the row.

6 Claims, 2 Drawing Sheets

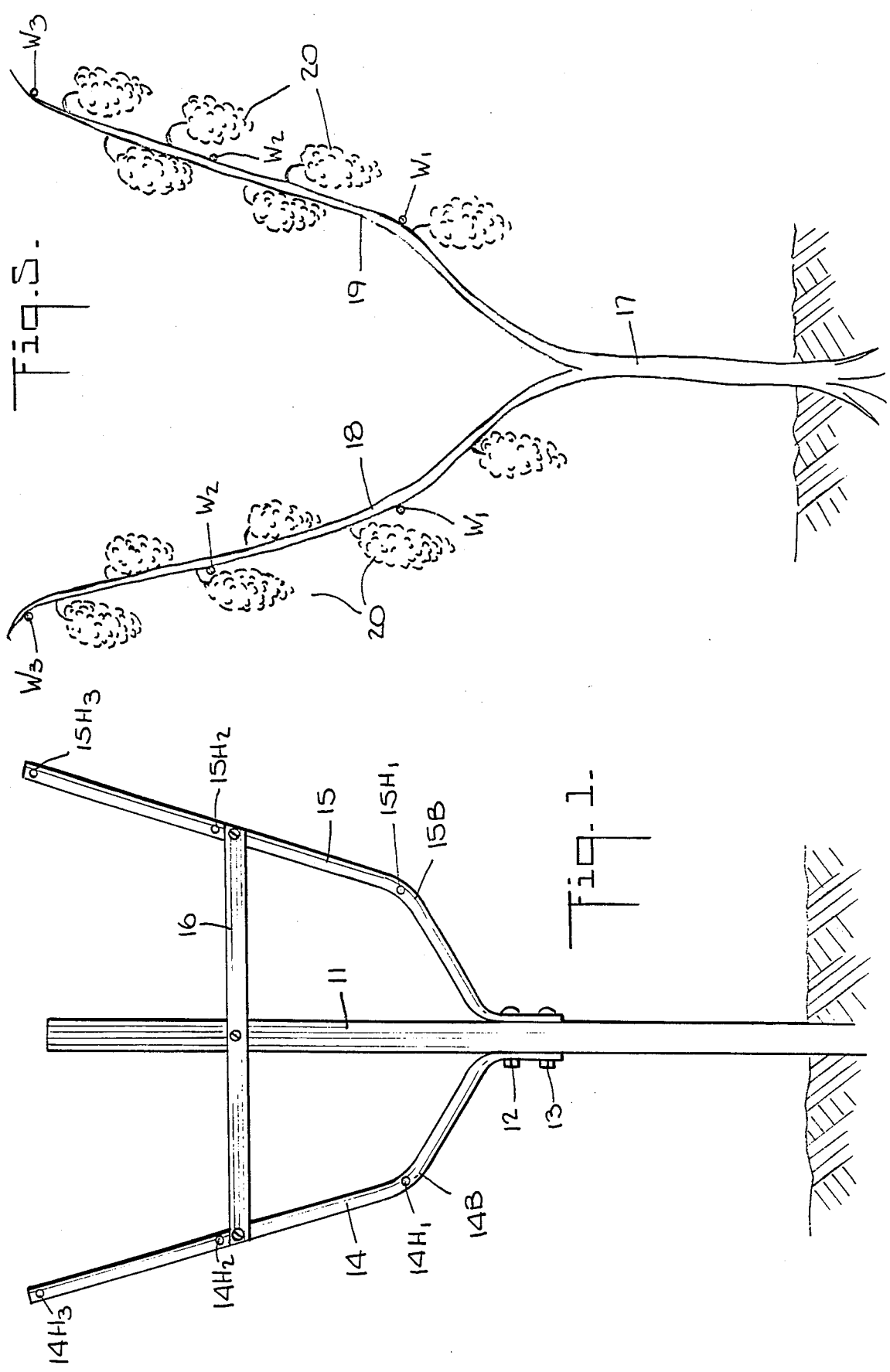

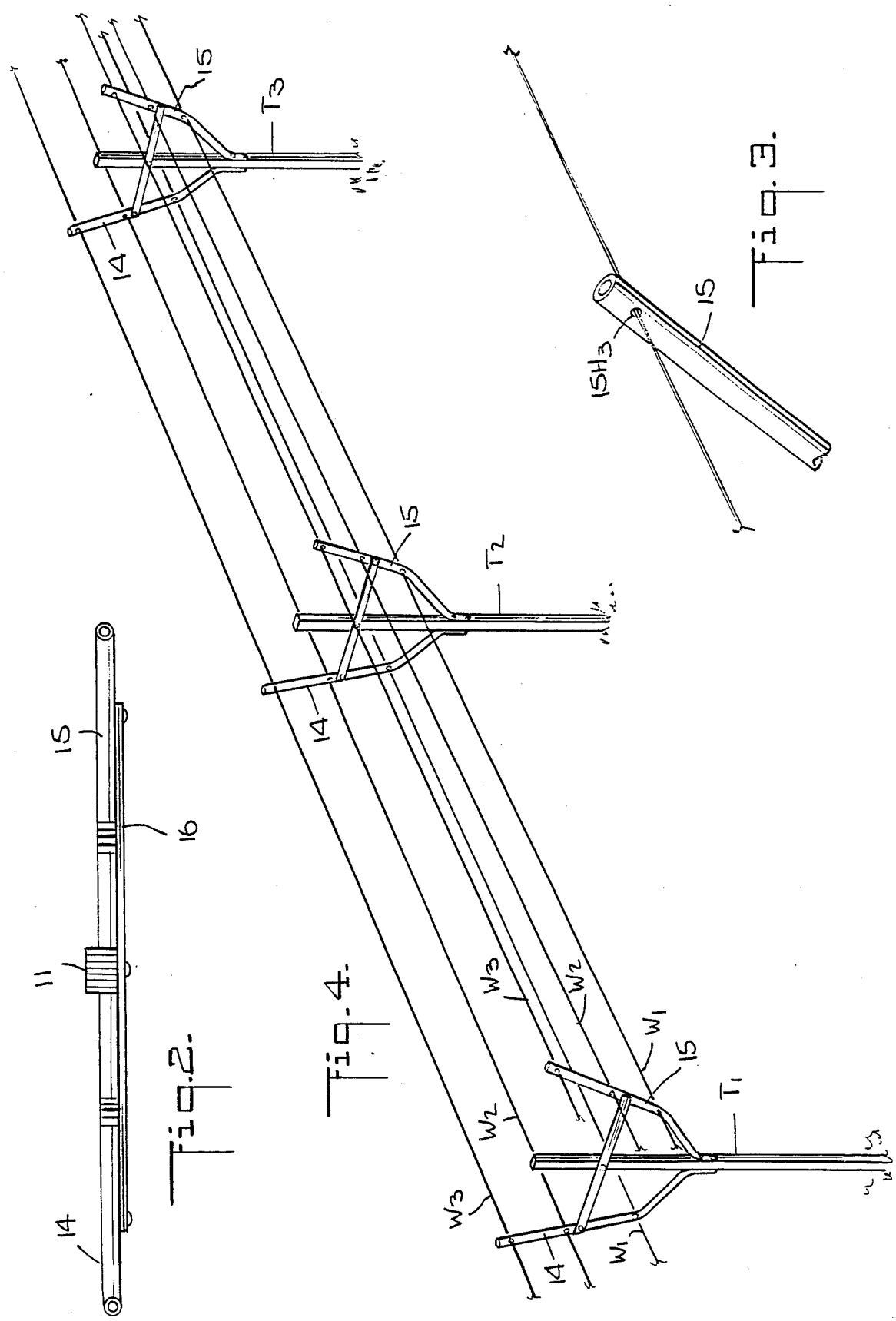

GOBLET TRELLIS

BACKGROUND OF INVENTION

1. Field of Invention

This invention relates generally to trellises for supporting wires to train grape vines, and in particular to a trellis having a goblet-like form to support an array of horizontal wires for training the upwardly growing canes of grape vines.

2. Status of Prior Art

A grape vine yielding grapes that are fermentable to produce wine is a woody plant of the genus Vitus. This plant climbs by means of tendrils or canes from which emerge grape clusters. There are many cultivated hybrids and horticultural varieties of grape vines derived from New World and Old World species, such as *Vitus Vinifera* and *Vitus Labrusca*.

In order to promote the progressive growth of grape vines in a vineyard, it is conventional to set trellises into the ground in a row at suitable distances from one another. These trellises act to support horizontal wires running along both sides of the trellises for training canes of grape vines planted in the spaces between the trellises in the row.

Traditional American varieties of *Vitus Labrusca*, such as Concord grapes, are supported by horizontal training wires running on either side of the trellis posts in the row thereof. These plants are then trained by the wires so that the canes grow down from the horizontal wires which are usually about five feet above ground and about two feet apart.

Trellises whose structures are suitable for climbing vines of the *Vitus Labrusca* varieties are disclosed in the Lewis et al. U.S. Pat. No. 3,690,033, as well as in the Barton U.S. Pat. Nos. 3,337,988 and 3,419,998. In these prior art patents, the trellis disclosed therein is constituted by a post which is set into the ground and a pair of angled arms attached to opposite sides of the post to provide a support for a pair of parallel, horizontal training wires. These wires are elevated relative to the ground, thereby making it possible for the canes to go over the wire and grow downwardly therefrom to form a canopy.

Trellises of this prior type are not appropriate for *Vitus Vinifera* varieties of European grapes such as Chardonnay, for the canes of these vines only grow upwardly. Accordingly, the need exists for a trellis for so supporting training wires to promote the upward growth of such canes.

SUMMARY OF INVENTION

In view of the foregoing, the main object of this invention is to provide a trellis for supporting wires to train grape vines whose canes grow upwardly.

More particularly, an object of this invention is to provide a trellis of the above type in which the trellis is in a goblet form to support pairs of horizontal wires at levels one above the other as is required for the progressive upward growth of the canes.

Also an object of this invention is to provide a trellis of high strength yet of simple construction so that the trellis components can be mass produced and assembled at low cost.

Briefly stated, these objects are attained in a trellis for supporting horizontal wires to train grape vines whose canes grow upwardly. The trellis comprises a post which is set in the ground and a pair of tubular metal arms attached at their lower ends to opposite sides of the post, the arms having a bend therein to create above ground a symmetrical goblet-like form in which the portions of the arms above the bends diverge outwardly with respect to the post. The arms are bridged by a rigid cross brace which is attached at its ends to the arms at a point intermediate the bend and the upper end thereof, the brace being secured to the post to rigidify the structure. Bored at corresponding positions in the arms are three sets of holes, one set being adjacent the upper end, the other at about the intermediate point, and the third at about the bend. A series of spaced-apart trellises are set up in a vineyard row and wires are strung through their holes to create an array of horizontal wires at different levels for training the upwardly growing canes of grape vines planted in the spaces between the trellises in the row.

OUTLINE OF DRAWINGS

For a better understanding of the invention as well as other objects and further features thereof, reference is made to the following detailed description to be read in conjunction with the accompanying drawings, wherein:

FIG. 1 is an elevation view of a trellis in accordance with the invention;

FIG. 2 is a top view of the trellis;

FIG. 3 shows how a training wire goes through a tubular arm of the trellis;

FIG. 4 shows a row of trellises in a vineyard and an array of training wires supported thereby; and FIG. 5 shows how the upwardly growing canes of a grape vine are supported by the training wires of the array.

DESCRIPTION OF INVENTION

The Trellis Structure:

Referring now to FIGS. 1 and 2, there is shown the structure of a trellis in accordance with the invention. The trellis includes a wood post 10 preferably of square cross section that is driven into the ground 11. The length of the post is such that the portion thereof above ground is 73 inches in length. It is to be understood, however, that this dimension and the others to be given are by way of example only, so that the relative scale of the components forming the trellis can be appreciated in practical terms.

Attached to opposite sides of post 10 by means such as bolts 12 and 13 are the flattened lower ends of a pair of like tubular arms 14 and 15. These are preferably made from a pipe of galvanized iron or other high strength metal which is corrosion resistant and capable of surviving prolonged exposure to the elements. Each arm has a bend therein (14B and 15B) in its lower end portion so that when the arms are attached to post 10 the arms assume a symmetrical goblet-like form in which the portions above the bend diverge outwardly with respect to the post. The horizontal distance between the bends in the arms is 27 inches and the vertical distance between the bends and ground is also 27 inches. The vertical distance between the upper end of the arms and ground is 73 inches.

Bridging arms 14 and 15 is a rigid cross brace 16 which is 35 inches long and is preferably formed of galvanized steel one inch wide and ⅛ inch thick. Brace 16 is secured to the arms at an intermediate point thereon which is about midway between the upper end and the bend therein. The midpoint of the brace is bolted to post 10, thereby rigidifying the trellis structure.

Bored in the tubular metal arms 14 and 15 at bends 14B and 15B are holes $14H_1$ and $15H_1$. Also bored in the arms at a higher level at corresponding positions just above brace 16 are holes $14H_2$ and $15H_2$, while bored in the arms adjacent their upper ends are holes $14H_3$ and $15H_3$. As shown in FIG. 3, these holes serve to support horizontal training wires, such as wire W running through bore $14H_2$ in arm 14.

The pairs of holes are equi-spaced, one above the other, and in the example given, holes $14H_1$-$15_1$ are 23 inches below holes $14H_2$-$15H_2$, while holes $14H_3$-$15H_3$ are 23 inches above holes $14H_2$-$15H_2$. However, because of the goblet form, the holes at the second level are farther out in the horizontal direction from those at the first level and the holes at the third level are farther out in the horizontal direction than those at the second level. Thus, when horizontal wires are strung through these holes to train upwardly growing canes, the canes are caused to diverge outwardly to minimize the exposure of grape clusters emerging from these canes to solar radiation.

The Trellis Row:

In setting up trellises in accordance with the invention, as shown in FIG. 4, trellises $T_1$, $T_2$, $T_3$, etc., are anchored in the ground in a vineyard at spaced positions to form a row. Strung through the holes in these trellises are pairs of parallel horizontal training wires. The wire pair $W_1$ is at the lowest level, the wire pair $W_2$ is at the intermediate level, and the wire pair $W_3$ is at the highest level. It is to be understood, however, that the invention is not limited to three levels, and in practice it may have a greater number of levels.

As shown in FIG. 5, when a grape vine is planted in a space between the trellises in the row, its trunk 17 produces canes 18 and 19, one cane 18 being trained to grow upwardly on the left set of wires in the array, and the other cane 19 being trained to grow upwardly on the right set of wires. Grape clusters 20 emerge from these diverging and upwardly growing canes, and because of the spread therebetween, this maximizes exposure to sun rays. In practice, catch wires (not shown) may be supported on the upper edges of the cross braces of the trellises to assist in training operations.

Because the wires are simply passed through bores in the holes, it is a simple matter to erect the array of wires on the spaced trellises. The wires need only be tied or clipped to the end trellises in the row. It is therefore a simple matter to dismantle the trellis row, for the wires in the array slip out of the bore holes.

While there has been shown and described a preferred embodiment of a goblet trellis in accordance with the invention, it will be appreciated that many changes and modifications may be made therein without, however, departing from the essential spirit thereof.

I claim:

1. A trellis system for promoting the progressive growth of left and right canes emerging upwardly from the trunk of a grape vine, said trellis system comprising:
    (A) a plurality of posts settable into the ground, whereby a series of posts may be anchored at spaced positions in a vineyard row to form a trellis system, the grape vines being planted in the spaces between the posts forming the trellis system;
    (B) a pair of rigid arms attached at their lower end portions to each post on opposite sides thereof and at an angle to the post, each arm having at least one bend therein above its respective low end portion whereby the resultant structure is in the form of a symmetrical goblet in which the portions of the arms above the bends diverge outwardly with respect to the post;
    (C) a cross brace bridging the arms and attached thereto at an intermediate point between said at least one bend and the upper end, said brace being secured at its midpoint to the post to rigidify the structure; and
    (D) a hole in each arm at about said at least one bend therein, at about said intermediate point and about the upper end to define three wire support levels, and horizontal wires running through these holes on each opposite side of the post to create a left and right array of training wires for supporting respectively the upwardly growing left and right canes in outwardly diverging paths, the grape clusters which emerge from these diverging and upwardly growing canes being spread thereby to maximize their exposure to sun rays.

2. A trellis system as set forth in claim 2, wherein the three levels are vertically equidistant from each other.

3. A trellis system as set forth in claim 2, wherein said post is of wood and has a square cross section.

4. A trellis system as set forth in claim 2, wherein said arms are formed by metal tubes whose lower ends are flattened for attachment to opposite sides of the post.

5. A trellis system as set forth in claim 4, wherein said tubes are galvanized steel pipes.

6. The trellis system as set forth in claim 5, wherein said brace is formed by a strip of galvanized steel.

* * * * *